(12) United States Patent
Efimov et al.

(10) Patent No.: US 6,673,497 B2
(45) Date of Patent: *Jan. 6, 2004

(54) HIGH EFFICIENCY VOLUME DIFFRACTIVE ELEMENTS IN PHOTO-THERMO-REFRACTIVE GLASS

(75) Inventors: Oleg M. Efimov, Orlando, FL (US); Leonid B. Glebov, Orlando, FL (US); Vadim I. Smirnov, Orlando, FL (US)

(73) Assignee: University of Central Florida, Orlando, FL (US)

( * ) Notice: Subject to any disclaimer, the term of this patent is extended or adjusted under 35 U.S.C. 154(b) by 272 days.

This patent is subject to a terminal disclaimer.

(21) Appl. No.: 09/750,708

(22) Filed: Dec. 28, 2000

(65) Prior Publication Data

US 2002/0045104 A1 Apr. 18, 2002

Related U.S. Application Data

(63) Continuation-in-part of application No. 09/648,293, filed on Aug. 24, 2000.
(60) Provisional application No. 60/174,432, filed on Jan. 4, 2000.

(51) Int. Cl.[7] ................................. G03H 1/02
(52) U.S. Cl. ............... 430/1; 430/2; 430/290; 385/37; 359/3
(58) Field of Search ............... 430/1, 2, 290; 359/3; 385/37

(56) References Cited

U.S. PATENT DOCUMENTS 3,640,604 A   2/1972   Yarnell .................. 350/162 SF
3,675,990 A   7/1972   Kogelnik et al. .......... 350/311

(List continued on next page.)

FOREIGN PATENT DOCUMENTS

JP         03-081718     *  4/1991

OTHER PUBLICATIONS

IBM Tech. Discl. Bull., Vol 31(3) pp. 18–21 (Aug. 1988).*
Efimov , et al. "Laser–induced Damage of Photo–Thermo–Refractive Glasses for Optical–Holographic–Element Writing", Proc. SPIE vol. 3578, pp. 564–575 (1999).*

(List continued on next page.)

Primary Examiner—Martin Angebranndt
(74) Attorney, Agent, or Firm—Law Offices of Brian S. Steinberger, P.A.; Brian S. Steinberger

(57) ABSTRACT

Novel volume holographic elements were made from Bragg diffractive gratings in photo-thermo-refractive (PTR) glass with absolute diffraction efficiency ranging from greater than approximately 50% up to greater than approximately 93% and total losses below 5%. Both transmitting and reflecting volume diffractive elements were done from PTR glasses because of high spatial resolution enabling recording spatial frequencies up to 10000 mm$^{-1}$. The use of such diffractive elements as angular selector, spatial filter, attenuator, switcher, modulator, beam splitter, beam sampler, beam deflectors controlled by positioning of grating matrix, by a small-angle master deflector or by spectral scanning, selector of particular wavelengths (notch filter, add/drop element, spectral shape former (gain equalizer), spectral sensor (wavelength meter/wavelocker), angular sensor (pointing locker), Bragg spectrometer (spectral analyzer), transversal and longitudinal mode selector in laser resonator were described. Combinations of those elements in the same volume are available too.

25 Claims, 17 Drawing Sheets

U.S. PATENT DOCUMENTS

| | | | |
|---|---|---|---|
| 4,057,408 A | 11/1977 | Pierson et al. | 65/18 |
| 4,514,053 A | 4/1985 | Borrelli et al. | 350/162.2 |
| 4,541,694 A * | 9/1985 | Sullivan et al. | 350/371 |
| 4,567,104 A | 1/1986 | Wu | 428/410 |
| 4,670,366 A | 6/1987 | Wu | 430/13 |
| 4,894,303 A | 1/1990 | Wu | 430/13 |
| 4,946,253 A | 8/1990 | Kostuck | 350/169 |
| 4,965,152 A | 10/1990 | Keys et al. | 430/1 |
| 5,078,771 A | 1/1992 | Wu | 65/30.11 |
| 5,098,803 A * | 3/1992 | Monroe et al. | 430/1 |
| 5,196,282 A | 3/1993 | Knobbe | 430/2 |
| 5,285,517 A | 2/1994 | Wu | 385/142 |
| 5,339,305 A * | 8/1994 | Curtis et al. | 369/112 |
| 5,486,934 A | 1/1996 | Huang | 359/15 |
| 5,684,611 A | 11/1997 | Rakuljic et al. | 359/7 |

OTHER PUBLICATIONS

*Optical Holography Principles, techniques and applications*, second edition, P. Hariharan, Cambridge University Press.

*Full–Color Photosensitive Glass*, S. Donald Stookey, George H. Beall and Joseph E. Pierson, Journal of Applied Physics, vol. 49, No. 10, Oct. 1978, pp. 5114–5123.

*Photolytic Technique for Producing Microlenses in Photosensitive Glass*, Borelli, Morse, Bellman and Morgan, Applied Optics, vol. 24, No. 16, Aug. 15, 1985, pp. 2520–2525.

*Photothermal Refractive Effect in Silicate Glasses*, Borgman, Glebov, Nikonorov, Petrovskii, Savvin and Tsvetkov, Sov. Phys. Dokl, vol. 34, No. 11, Nov. 1989, pp. 1011–1013.

*Polychromic glasses—A New Material for Recording Volume Phase Holograms*, Glebov, Nikonorov, Panysheva, Petrovskii, Savvin, Tunimanova and Tsekhomskiir, Sov. Phys. Dokl, vol. 35, No. 10, Oct. 1990, pp. 878–880.

*New Ways to Use Photosensitive Glasses for Recording Volume Phase Holograms*, Glebov, Nikonorov, Panysheva, Petrovskii, Savvin, Tunimanova, and Tsekhomskii, Opt. Spectrosc., vol. 73, No. 2, Aug. 1992, pp. 237–241.

*Photo–Induced Processes in Photo–Thermo–Refractive Glasses*, Glebov, Glebova, Richardson and Smirnov, XVIII International Congress on Glass, San Francisco, CA, Jul. 5–10, 1998.

*High–Efficiency Bragg Gratings in Photothermorefractive Glass*, Efimov, Glebov, Glebova, Richardson and Smirnov, Applied Optics, vol. 38, No. 4, Feb. 1999, pp. 619–627.

*Photo–Thermo–Refractive Glasses for High–Efficiency Bragg Gratings in UV, Visible, and IR Regions*, Efimov, Francois–Sant–Cyr, Glebov, Glebova, Richardson and Smirnov.

* cited by examiner

HIGH EFFICIENCY VOLUME DIFFRACTIVE ELEMENTS IN PHOTO-THERMO-REFRACTIVE GLASS

This application is a continuation-in-part of the U.S. patent application Ser. No. 09/648,293 filed Aug. 24, 2000, now allowed, and further claims priority from U.S. Provisional Application Ser. No. 60/174,432 filed Jan. 4, 2000, now abandoned.

This invention relates to holographic optical elements and in particular to Bragg gratings from doped photo-thermo-refractive (PTR) silicate glasses having an improved absolute diffraction efficiency and was funded by the Ballistic Missile Defense Organization Contract 66001-97-C60008.

BACKGROUND AND PRIOR ART

Volume holograms were invented by Yu Denisyuk in 1962 (see Yu.N. Denisyuk. "Photographic reconstruction of the optical properties of an object in its own scattered radiation field." Soviet Physics Dokl, 7 pp.17–21,1962 {hereinafter referred to as [Ref. 1]}) and initially used for image reconstruction with non-coherent radiation. However, in 1972 Kogelnik et al disclosed the use of volume holograms as reflective type narrow-band filter provided by the combination of a transmitting hologram and a mirror in U.S. Pat. No. 3,675,990 issued Jul. 11, 1972 {hereinafter referred to as [Ref. 2]} This patent can be considered as the first application of volume holograms as optical elements using their features of strong angular and spectral selectivity. Its combination of a transmitting hologram and a conventional mirror realized the creation of an efficient reflective filter by fabrication of volume grating with relatively small spatial frequency and having about 50% diffraction efficiency.

The further significant evolution of the approach described in Ref. [2] developed in the 1990s because of new requirements of the optical industry (spectral selection for image recognition and optical communications) and development of new photosensitive holographic materials. It was proposed in D. E. Keys et al, U.S. Pat. No. 4,965,152 issued Oct. 23, 1990 {hereinafter referred to as Ref. [3]} to produce notch filters for laser lines suppression based on reflective volume holograms recorded in photopolymers. This filter has shown attenuation of laser lines in the visible spectral region up to 1000 times. However, no data on spectral width and side lobes were published. Of course, the problem of the very soft and chemically active layer is a disadvantage of the discussed approach.

Creation of photo-refractive crystals (e.g. iron-doped lithium niobate) enabled a more advanced approach for diffractive optical elements see: G. A. Rakuljic et al, U.S. Pat. No. 5,440,669 issued Jul. 2, 1992 {hereinafter referred to as [Ref. 4]}; G. A. Rakuljic, V. Leyva. "Volume holographic narrow-band optical filter". Optics Lett. 18, 459-461(1993) {hereinafter referred to as {Ref. 5]}; and, G. A. Rakuljic et al, U.S. Pat. No. 5,684,611 issued Nov. 4, 1997 {hereinafter referred to as [Ref. 6]}. Narrow-band spectral filters based on volume diffractive gratings recorded in photo-refractive crystals were created with spectral width in visible region down to 0.05 nm. These filters were proposed to serve in both planar and non-planar geometry for corr-elators and telescopes. This new and very promising approach had some disadvantages because of such features of photo-refractive crystals as opacity in the UV region, sensitivity to visible radiation after recording, and low thermal stability.

Thus, the further progress in diffractive elements developing was restrained by the lack of appropriate photosensitive materials. P. Hariharan in his recent book "Optical Holography, Principles, Techniques, and Applications." Chapter 7 pp. 95–124 (Cambridge University Press, 1996) {hereinafter referred to as [Ref. 7]} on page 96 reports that the main photosensitive materials available for high efficiency hologram recordings are silver halide photographic emulsions, dichromated gelatin, photoresists, photopolymers, photothermoplastics, polymers with spectral hole-burning, and photo-refractive crystals. Each of these materials has their merits, but all have drawbacks. These organic materials (photographic emulsions, dichromated gelatin, and photopolymers) are sensitive to humidity. Moreover, they significantly shrink in the development process. Inorganic materials (photo-refractive crystals) have low resistance to elevated temperatures and produce additional patterns because of exposure to the beam diffracted from the recorded grating.

S. D. Stookey in an article "Photosensitive glass, (a new photographic medium)" Industrial and Engineering Chem., 41, 856–861 (1949) {hereinafter referred to as [Ref. 8]} reported a two-step process (exposure and thermal development) to record a translucent image in glass because of light scattering caused by a difference between refractive indices of a precipitated crystalline phase and the glass matrix. According to this disclosure, the first step is the exposure of the glass sample to UV radiation, which produces ionization of a cerium ion. The electrons released from cerium are then trapped by a silver ion. As a result, silver is converted from a positive ion to a neutral atom. This stage corresponds to a latent image formation and no significant coloration occurs.

The next step is a thermal development. This development process includes two stages described in publications [9, 10]. The first stage involves the high diffusion rate silver atoms possess in silicate glasses. This diffusion leads to creation of tiny silver crystals at relatively low temperatures (450–500° C.). A number of silver clusters arise in exposed regions of glass after aging at elevated temperatures. These silver particles serve as the nucleation centers for sodium and fluorine ion precipitation and cubic sodium fluoride crystal growth occurs at temperatures between 500° C. and 550° C. Further heat treatment leads to growth of numerous elongated pyramidal complexes of (Na,Ag—F,Br) crystals on the surface of cubic NaF crystals. This mixture of crystals can produce opal coloration in the case of large crystal sizes or yellow coloration caused by colloidal silver precipitated on interfaces of dielectric crystals. This multi-stage photo-thermal process in photosensitive glass was proposed for decoration, color photography, sculpture, and even for holography see: S. D. Stookey, G. H. Beall, J. E. Pierson. "Full-color photosensitive glass". J. Appl. Phys., 49, pp.5114–5123 (1978) {hereinafter referred to as [Ref. 9]; N. F. Borrelli, J. B. Chodak, D. A. Nolan, T. P. Seward. "Interpretation of induced color in polychromatic glasses". J. Opt. Soc. Amer., 69 pp.1514–1519 (1979) {hereinafter referred to as [Ref. 10]}; and N. F. Borrelli et al, U.S. Pat. No. 4,514,053 issued Apr. 30, 1985 {hereinafter referred to as [Ref. 11]}. However, no evidences of any hologram recorded in these glasses are disclosed in these references [Refs. 9–11].

Several years later, the use of inorganic photosensitive glasses for phase hologram recording rather than as a photographic medium was reported in the literature. It was reported therein that Bragg gratings were obtained both in: lithium-aluminum-silicate (see V. A. Borgman, L. B.

Glebov, N. V. Nikonorov, G. T. Petrovskii, V. V. Savvin, A. D. Tsvetkov "Photo-thermal refractive effect in silicate glasses." Sov. Phys. Dokl., 34, 1011–1013 (1989) {hereinafter referred to as [Ref. 12]}); and sodium-zinc-aluminum-silicate (see L. B. Glebov, N. V. Nikonorov, E. I. Panysheva, G. T. Petrovskii, V. V. Savvin, I. V. Tunianova, V. A. Tsekhomskii "Polychromatic glasses—a new material for recording volume phase holograms" Sov. Phys. Dokl., 35, 878–880 (1990) {hereinafter referred to as [Ref. 13]}); and, (see L. B. Glebov, N. V. Nikonorov, E. I. Panysheva, G. T. Petrovskii, V. V. Savvin, I. V. Tunimanova, V. A. Tsekhomskii "New ways to use photosensitive glasses for recording volume phase holograms." Opt. Spectrosc., 73, 237–241 (1992) {hereinafter referred to as [Ref. 14]})glasses doped with silver and cerium, by exposure to UV radiation followed by thermal treatment. This phenomenon was named the "photo-thermo-refractive" (PTR) process. Glasses, which possess such properties, were called "photo-thermo-refractive" (PTR) glasses.

It was reported in Refs. [13] and [14] that a refractive index decrease of about $5 \times 10^{-4}$ occurs when dielectric crystals precipitated in glasses are exposed to radiation of a nitrogen laser at 337 nm. Conditions of glass exposure and development were found in those works to create Bragg gratings with relative diffraction efficiency up to 90%. These gratings were stable up to 400° C. The photosensitivity was found in the range of several $J/cm^2$ at a nitrogen laser wavelength (337 nm). Once developed, holograms in PTR glass were not destroyed by further exposure to visible light. Unfortunately, these materials reported in Ref. [12–14], do not met all requirements formulated in Hariharan, particularly absolute diffraction efficiency [6, Table 7.1 at page 96] because their property of excessive (strong) scattering of the radiation imposed on the hologram. This scattering results in low absolute diffraction efficiency of gratings in PTR glasses, which has been found not to exceed 45%.

SUMMARY OF THE INVENTION

The first object of the present invention is to provide diffractive gratings in glasses having the physical property of induced refractive index increment combined with low losses which enables high diffraction efficiency.

The second object of the present invention is to provide diffractive gratings in photo-thermo-refractive (PTR) glasses having the physical properties of high diffraction efficiency, low losses, high photosensitivity, high optical quality, high stability at elevated temperatures, humidity, and powerful optical illumination of volume for diffractive optical elements.

The third object of the present invention is to utilize high spectral and angular selectivity of volume diffractive gratings recorded in such homogeneous and transparent material as PTR glass for such diffractive optical elements as attenuators, beam splitters with arbitrary number of channels and splitting ratios, wavelength multiplexers and demultiplexers, angularly and spectrally controlled laser beam deflectors, longitudinal and transversal mode selectors in laser resonators, narrow-band spectral and angular selectors, spectral equalizers, and combinations of the mentioned elements in the same volume of glass.

The fourth object of the present invention is to provide illustrative devices based on the volume diffractive elements in PTR glasses.

Preferred embodiments of the invention are volume holographic optical elements of photo-thermal refractive (PTR) glass having an absolute diffraction efficiency of greater than approximately 50% and preferably having an absolute diffraction efficiency of at least approximately 90% and even up to approximately 96%.

Further objects and advantages of this invention will be apparent from the following detailed description of the presently preferred embodiments, which are disclosed in the following text and properties of which are illustrated in the accompanying drawings.

BRIEF DESCRIPTION OF THE FIGURES

FIG. 5b is the use of the Bragg grating of FIG. 5a.

FIG. 8a shows a beam splitting system of plural channels by transmitting through the Bragg gratings of FIG. 7a.

FIG. 13b shows dependence of amplifier gain coefficient on wavelength of the corrector of FIG. 13a.

FIG. 15b illustrates dependence of a ratio of intensities of beams diffracted by each grating, versus deviation from the mean angle of FIG. 15a.

DESCRIPTION OF THE PREFERRED EMBODIMENT

Figure 1A:
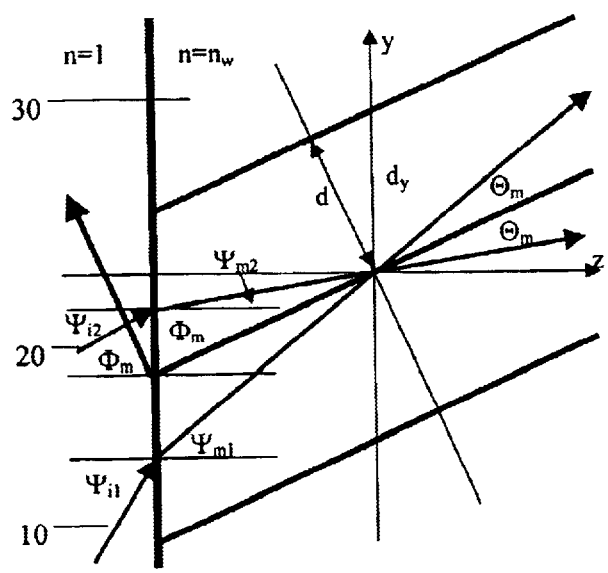
FIG. 1a is a geometry of interference pattern fabricating by writing beams.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

It is would be useful to discuss the meanings of some words used herein and their applications:
- a diffractive optical element is such optical element which produces optical beam transformation by means of diffraction on periodical or quasi-periodical structure as distinct from refractive (lenses. prisms, etc.) and reflective (mirrors) elements;
- periodical or quasi-periodical structure is often named grating;
- grating can be produced by periodical relief of the surface, or variations of absorption coefficient and refractive index; corresponding gratings and elements are named surface relief, amplitude, and phase ones;
- a diffractive element is named a holographic element if the periodical structure was produced by interference of optical beams in a photosensitive medium; and,
- if a diffractive pattern is embedded in the volume of element, it is named a volume diffractive element or Bragg grating.

In our copending U.S. application Ser, No. 09/648,293 filed Aug. 24, 2000 which is of common assignee and incorporated herein by reference thereto, a novel photosensitive material for effective hologram recording has been taught which has provided record high efficiency and high reliability of volume diffractive gratings. This U.S. patent application Ser. No. 09/648,293 discloses a unique process that produces a new inorganic PTR glass as a medium for high-efficiency hologram recording with the properties and performance which meets the requirements indicated above. The process described in said Application, involves the steps of: melting of the PTR glass mixture; annealing the homogenized melt; preparing glass samples of from 0.5 to 10 mm thickness having an absorption coefficient of less 1 cm$^{-1}$ for wavelengths ranging from 280 to 380 nm; irradiating said sample with a patterned beam of radiation ranging from 50 mJ/cm$^2$ to 5000 mJ/cm$^2$, and thermal developing the PTR glass at temperatures from 500° to 650° C. for a period of from a few minutes to several hours; whereby a Bragg grating having an absolute diffraction efficiency of at least 90% is realized.

The glass was melted in an electrical furnace in 400 ml fused silica crucibles at 1460° C. for 5 hours with stirring to homogenize the melt. After the melting, the glass was poured onto a thick metal slab or cooled in the crucible to the annealing temperature. For structural and stress relaxation, the glass casting underwent annealing at 460° C. for several hours and then cooled to the room temperature with cooling rate of 0.2°/min. Thermal development was controlled by keeping the exposed specimen in the same furnace at a preferred temperature of 520° C., although temperatures from 500° C. to 650° C. can be used, from periods of a few of minutes to several hours. Glasses were exposed to radiation of a He—Cd laser at 325 nm. An exposure to interference pattern was used to produce Bragg gratings in glass. To do this, the beam was split and then matched under different angles, which provided spatial frequencies in the glass sample from 250 mm$^{-1}$ to 10,000 mm$^{-1}$. Holographic gratings of about 5 mm×5 mm size were recorded in samples ranging in thickness up to 2 mm.

The diffraction patterns were studied for Bragg gratings recorded in PTR glasses. Intensities of incident beam ($I_L$), transmitted beam ($I_0$), and diffracted beam ($I_1$) were measured by a two-head power meter. The reflection coefficient (p) was calculated by the Fresnel formula $\rho=(n-1/n+1)^2$ where n=1.49 is a refractive index of PTR glass. Relative and absolute diffraction efficiencies were calculated as:

$$\eta_R = \frac{I_1}{I_0 + I_1} \tag{1}$$

$$\eta_A = \frac{I_1}{(1-\rho)^2 I_L} \tag{2}$$

A term responsible for the glass surface reflection in the formula for the absolute diffraction efficiency (2) was used to get data connected with the losses in the recording medium because reflection losses can be easily eliminated with an antireflection coating. The relative diffraction efficiency (1) allows description the oscillating part of the induced refractive index by Kogelnik's formula (see H. Kogelnik. "Coupled wave theory for thick hologram gratings". The Bell System Technical Journal, 48, 2909–2946, 1969{hereinafter [Ref15]}):

$$\delta n = \frac{\lambda \cos\Theta \arcsin(\sqrt{\eta_R})}{\pi d}, \tag{3}$$

where λ is a wavelength of reading beam, Θ is the Bragg angle in the medium, d is the thickness of the specimen.

Diffraction efficiency of Bragg gratings recorded in PTR glasses was studied as a function of conditions of writing (exposure and spatial frequency of interference pattern) and development (period). It was found that diffraction efficiency approached a high value after some exposure at elevated temperature. Diffraction efficiency growth at increasing period of thermal development is obviously caused by refractive index changes as a result of crystalline phase precipitation. Refractive index change up to $10^{-3}$ was recorded both by interferometric measurement of exposed area and by calculations based on diffraction efficiency measurements. This value means that a number of high efficiency Brag gratings can be recorded in the same volume of PTR glass. No significant dependence of diffraction efficiency on spatial frequency up to 2500 $mm^{-1}$. The absence of a drop in frequency response at low frequencies is a feature of the PTR process compare to the photorefractive process.

To find out the ultimate spatial frequency of PTR glass, the samples were exposed to an interference pattern produced by interaction of counter-propagating beams of He—Cd laser at 325 nm to record Bragg mirror. The frequency of interference pattern was maximal in this case and equaled to 9200 $mm^{-1}$. A number of spots with exposure ranging from 0.3 to 40 $J/cm^2$ were irradiated by the interference pattern in this arrangement. A reconstruction of all gratings was performed in the same arrangement but no mirror was placed. It was found that Bragg gratings were recorded in each irradiated spot. The highest absolute diffraction efficiency at 325 nm reached 12.6% after two hours of thermal development at 520° C. To the best of our knowledge, this value is the highest for reflective Bragg grating for the UV region of spectrum. The data shown above allows application of Bragg gratings in PTR glasses both in transmitting and reflecting modes for IR, visible and UV spectral regions from 4000 nm to 300 nm.

The durability of holograms in PTR glasses is remarkable. It was found that secondary heat treatment up to 400° C. does not reduce diffraction efficiency. The developed holograms were exposed to radiation of 20 mW He He—Ne laser at 633 nm and 1 mW He—Cd laser at 325 nm for 5–8 hours without any hologram destruction.

A photothermorefractive glass has been developed for volume diffractive element recording a volume holographic optical element having the following physical characteristics phase has parameters of volume holographic optical elements(transmitting and reflecting Bragg gratings) are as follows:

transparency from approximately 300 nm to approximately 4000 nm induced losses in visible region below approximately 0.1 $cm^{-1}$, in IR region below approximately 0.01 $cm^{-1}$ region of photosensitivity from 280 nm to 370 nm exposure dozes from 50 $mJ/cm^2$ to 5000 $mJ/cm^2$ refractive index variations up to $10^{-1}$ spatial frequencies up to 10000 $mm^{-1}$ absolute diffraction efficiency greater than approximately 50% preferably above 90% and optimally greater than approximately 96%.

1. Theoretical Description

Figure 1B:
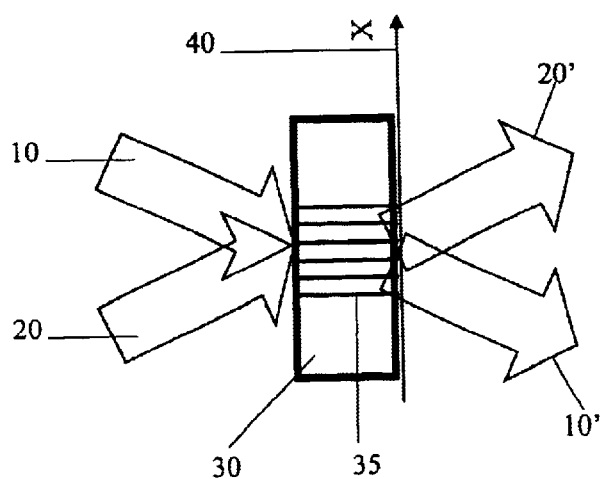
FIG. 1b represents the fabrication of a Bragg grating in a PTR glass.

To fabricate holographic optical elements in PTR glasses, the process disclosed in U.S. patent application Ser. No. 09/648,293 filed Aug. 24, 2000 was used. A periodical structure of refractive index in the glass volume was produced by exposure of virgin glass to a periodical pattern of UV radiation in the range of PTR glass photosensitivity which ranged from 280 to 370 nm (e.g. 325 nm from He—Cd laser). A periodical pattern was produced by interference of two UV laser beams launched to the PTR glass flat surface at different angles. FIGS. 1a and 1b shows geometry of illumination of photosensitive plate 30 with two writing beams 10 and 20 launched at incident angles of $\Psi_{i1}$ and $\Psi_{i2}$. Writing beams 10, 20 interact with photosensitive material 30 underwent attenuation and become transmitted beams 10' and 20'. All calculations shown below were made in accordance with Kogelnik's coupled wave theory [Ref. 15]. Convergence angle of writing beams in air is:

$$\Theta_i = \frac{\Psi_{i1} - \Psi_{i2}}{2} \tag{4}$$

Angles of refraction in the medium with refractive index at writing wavelength of $n_w$ are:

$$\sin\Psi_{m1} = \frac{\sin\Psi_{i1}}{n_w} \quad \sin\Psi_{m2} = \frac{\sin\Psi_{i2}}{n_w} \tag{5}$$

Inclination of planes with constant phase shift (planes of future volume grating) is:

$$\Phi_m = \frac{1}{2}\arcsin\frac{\sin\Psi_{i1}}{n_w} + \frac{1}{2}\arcsin\frac{\sin(\Psi_{i1} - 2\Theta_i)}{n_w} \tag{6}$$

Convergence angle of writing beams in the medium is:

$$\Theta_m = \frac{1}{2}\arcsin\frac{\sin\Psi_{i1}}{n_w} - \frac{1}{2}\arcsin\frac{\sin(\Psi_{i1} - 2\Theta_i)}{n_w} \tag{7}$$

Distance between planes of volume grating is:

$$d = \frac{\lambda_w}{2n_w\sin\left[\frac{1}{2}\arcsin\frac{\sin\Psi_{i1}}{n_w} - \frac{1}{2}\arcsin\frac{\sin(\Psi_{i1} - 2\Theta)}{n_w}\right]} \tag{8}$$

Spatial frequency of volume grating is:

$$f = \frac{2n_w}{\lambda_w}\sin\left[\frac{1}{2}\arcsin\frac{\sin\Psi_{i1}}{n_w} - \frac{1}{2}\arcsin\frac{\sin(\Psi_{i1} - 2\Theta_i)}{n_w}\right] \tag{9}$$

Exposure of photosensitive PTR glass to the interference patters described in formulae (6)–(9) results in creating of planes of modified refractive index collinear to the planes of constant phase shift in FIG. 1a. The volume phase grating is recorded in the plate with fringe planes perpendicular to the plane of chart and tilted at angle $\Phi_m$ of the front surface. Grating vector $\vec{K}$ is:

$$|\vec{K}| = \frac{2\pi}{d} = 2\pi f, \tag{10}$$

where d is a grating period and $f=d^1$ is a spatial frequency. $\Phi_m$ is the angle between grating vector and the normal to the front surface. Refractive index variation n in the direction $\vec{K}$ is:

$$n = n_0 + n_1 \cos \vec{K} \, \vec{r}, \tag{11}$$

where $\vec{r}$ is radius-vector, $n_0$ is an average refractive index of the medium, and $n_1$ is a refractive index modulation. It is necessary to note that the standard definition of photoinduced refraction Δn in photo-physics and photo-chemistry differs from a definition of refractive index modulation in holography:

$$|\Delta n| = 2n_1 \quad (12)$$

In this case, refractive index of the medium at the reconstructing wavelength $n_r$ is different from holographic definition (11):

$$n_0 = n_r + 0.5\Delta n, \quad (13)$$

Formulae (6)–(9) gives inclination and spatial frequency of gratings which are produced in PTR glass after exposure to the interference pattern depicted in FIG. 1a followed with proper thermal development as detailed in said application Ser. No. 09/648,293.

Different values of $\Psi_{i1}$ and $\Psi_{i2}$ provide recording of transmitting and reflecting gratings with different spatial frequencies and different orientation with respect to the glass blank surface. These formulae are the basis for calculation of exposure pattern for diffractive elements in PTR glasses design and fabrication.

Figure 1C:
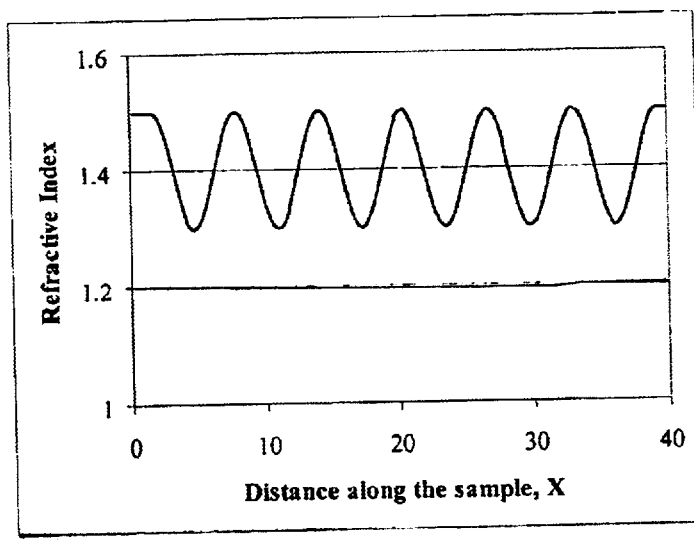
FIG. 1c shows the refractive index distribution inside PTR glass.
Figure 2A:
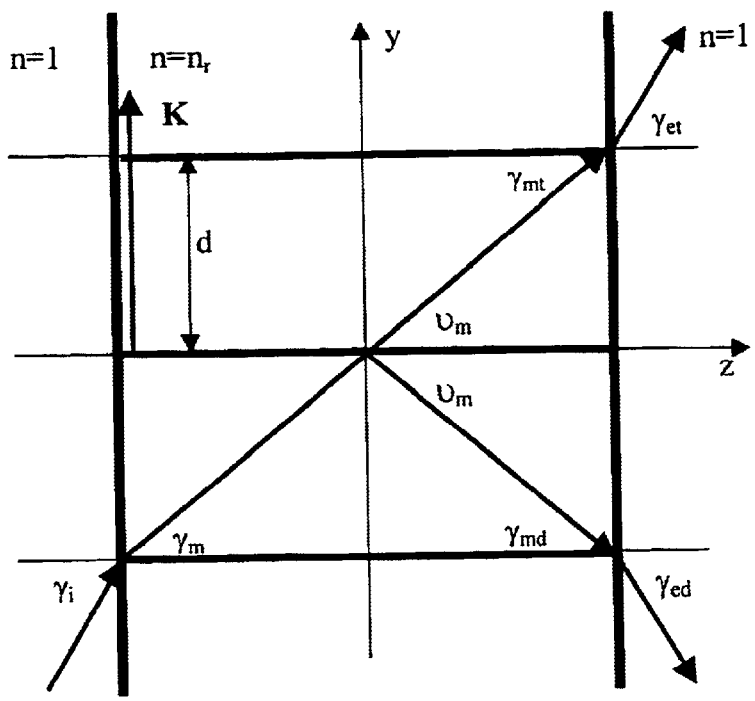
FIG. 2a shows the geometry of a volume hologram reconstruction in PTR glass.

An example of recording configuration for transmitting Bragg grating is shown in FIG. 1b where writing beams 10 and 20 form periodical distribution of intensity in the volume of photosensitive medium 30 resulted from their interference. After thermal development, this distribution of intensity is transformed to a spatial distribution along the axis X (40 in FIG. 1b) of refractive index. Periodical variations of refractive index are depicted in FIG. 1c. This periodical structure is a phase volume transmitting diffractive grating or a phase transmitting Bragg grating (35 in FIG. 1b and 2b) wherein the writing beam provides transmitted beam and diffracted beam after passage across transmitting Bragg grating. This grating diffracts the incident reading beam if wavelength and incident angle satisfy so called Bragg conditions. For all other beams this object is just a glass flat. For simplicity, geometry of reading is shown in FIG. 2a in the case of normal orientation of Bragg grating in respect to the glass flat surface ($\Psi_m = \pi/2$).

FIG. 1b is an example of fabricating (writing) a Bragg grating. Beams 10, 20 can be continuous writing beams having a wavelength of approximately 280 to approximately 360 nm. Beams 10, 20 can be emitted from a single laser source such as helium cadmium, an argon laser, and the like, where the originating beam was split by a conventional beam splitter. Beams 10 and 20 are combined and pass through the PTR glass 30. PTR 30 can be Na$_2$O—ZnO—Al$_2$O$_3$—SiO$_2$ (Sodium-Zinc-Aluminum-Silicate) glass doped with Ce, Ag, and F (Cerium, Silver, and Fluorine), and be approximately ¼ mm to approximately 10 mm thick, and approximately 2 mm to approximately 25 mm diameter. The PTR glass 30 is described in U.S. application Ser. No. 09/648,293 filed on Aug. 24, 2000, by the same assignee of the subject application, which is incorporated by reference. Interaction of beams 10, 20 inside PTR 30 produces periodical patterns inside PTR glass 30 which causes periodical changes of refractive index after thermal development (previously described in U.S. application Ser. No. 09/648, 293). Bragg grating 35 is the effect of beams 10, 20 interacting inside glass 30. FIG. 1c represents the effect of periodical refractive index variations in the volume of PTR glass 30 exposed to periodical modulation of refractive index vary up and down. Beams 10' and 20' become transmitted beams partially attenuated by PTR glass and will have lost approximately 5 to approximately 50% of original intensity values of beams 10 and 20.

Bragg condition for the incident beam in air (see FIG. 2a) is:

$$\lambda_r = 2d\sin\gamma_i = \frac{2\sin\gamma_i}{f}, \quad (14)$$

Note that the Bragg angle in air does not depend on a refractive index of the medium. Phase shift for rays propagating in exposed and unexposed areas is:

$$P = \frac{\pi n_1 t}{\lambda \cos\upsilon_m} = \frac{\pi n_1 t}{\lambda \sqrt{1 - \frac{\sin^2\gamma_i}{n_0^2}}}. \quad (15)$$

Diffraction efficiency of transmitting Bragg grating is:

$$\varepsilon = \sin^2 P = \sin^2\frac{\pi n_1 t}{\lambda \cos\upsilon_m} = \sin^2\frac{\pi n_1 t}{\lambda\sqrt{1 - \frac{\sin^2\gamma_i}{n_0^2}}}. \quad (16)$$

Figure 2B:
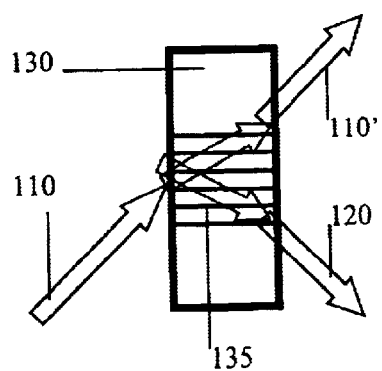
FIG. 2b is the use of the fabricated PTR glass from FIG. 1b.

FIG. 2b is an example of using the Bragg grating of FIG. 1b. The Bragg grating 135 in the PTR glass 130 used in these examples have an absolute diffraction efficiency of approximately 90% to approximately 96%, wavelengths of approximately 633 nm with spacing between each layers in the gratings 135 of approximately 0.5 microns.

Figure 3A:
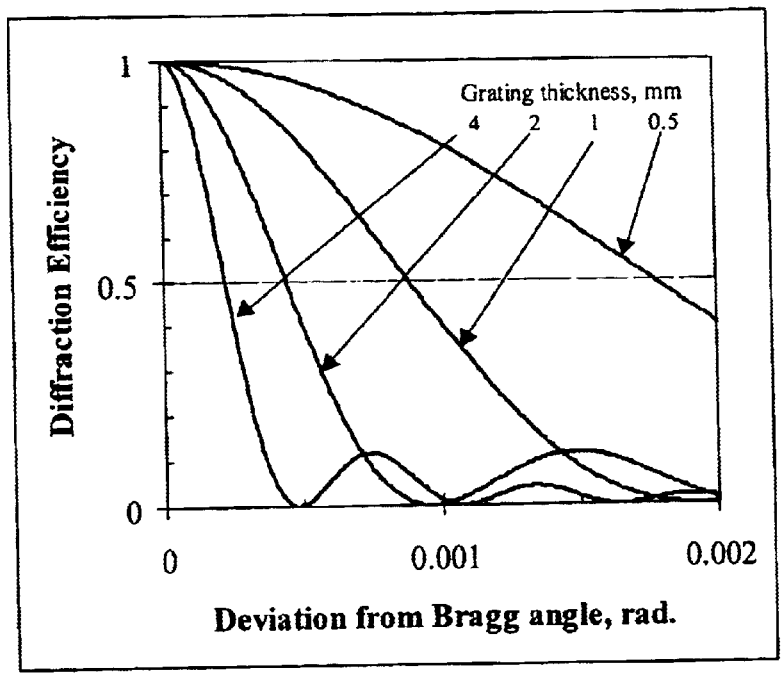
FIG. 3a is the diffraction efficiency of the Bragg grating of FIG. 2b versus deviation from Bragg angle.
Figure 3B:
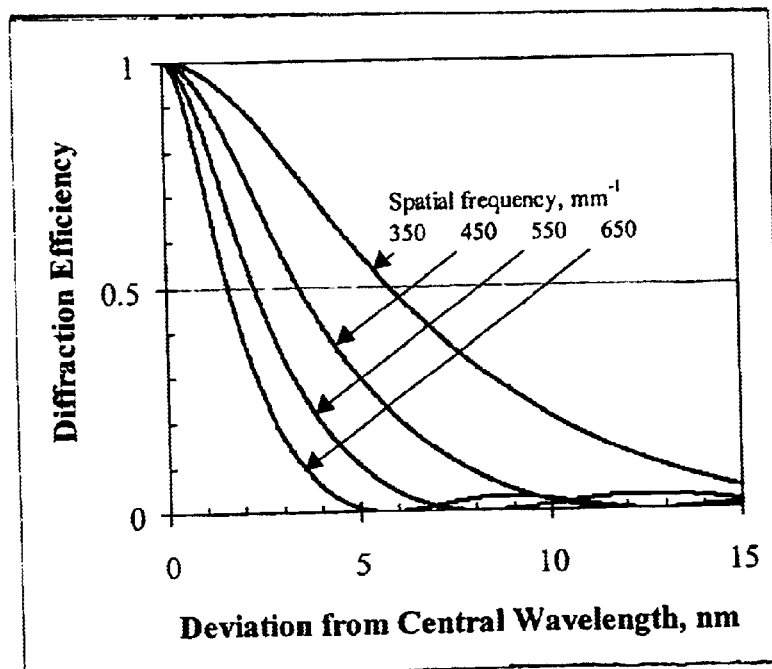
FIG. 3b is the diffraction efficiency of the Bragg grating of FIG. 2b versus deviation from central wavelength.

The Beam 110 can be either continuous or pulsed and be between approximately 300 nm to approximately 4000 nm (between ultraviolet and infrared regions) and be emitted by conventional transmitting laser source such as but not limited to semiconductors, solid state, liquid and gas lasers. Beam 110 can pass into PTR glass 130 at incident angle ($\gamma_1$ in FIG. 2a) of approximately 0 degrees to approximately 90 degrees to the face of the PTR glass 130. PTR glass 130 is the PTR glass 30 (of FIG. 2a) after being exposed to ultraviolet radiation followed by thermal development as described in U.S. application Ser. No. 09/648,293 to the same assignee as the subject invention, which is incorporated by reference. Changing wavelength or incident angle of incident beam 110 through PTR 130 changes diffractive beam 120, and is represented in FIGS. 3a, 3b, which represent the diffraction efficiencies of diffracted beam 120 relative to Bragg angle and wavelength. Transmitted beam 110' is the remainder of incident beam 110 that was not diffracted by Bragg grating 135 in PTR glass 130.

Diffraction efficiency of transmitting Bragg grating versus incident angle is shown in FIG. 3a. One can see main maximum and a number of side lobes. Angular selectivity is higher if spatial frequency or thickness is higher. Angular selectivity in the range of parts of milliradians is easily achieved with reasonable parameters of PTR Bragg gratings. FIG. 3b shows dependence of diffraction efficiency on wavelength of incident radiation. Spectral selectivity is higher for gratings with higher spatial frequency or thickness. Spectral selectivity of several nanometers can be achieved for spatial frequencies of hundreds of lines per millimeter. Selectivity of parts on nanometer can be observed in gratings with spatial frequencies of several thousands per millimeter. A spatial frequency up to 10000 line/mm can be produced in PTR glass.

Thickness of diffractive grating which secures 100% diffraction efficiency corresponds to phase shift of P=π/2 because sin(π/2)=1. Substitute this phase shift to (16):

$$t = \frac{\lambda \cos v_m}{2n_1} = \frac{\lambda \sqrt{1 - \frac{\sin^2 \gamma_i}{n_0^2}}}{2n_1}. \quad (17)$$

Figure 4:
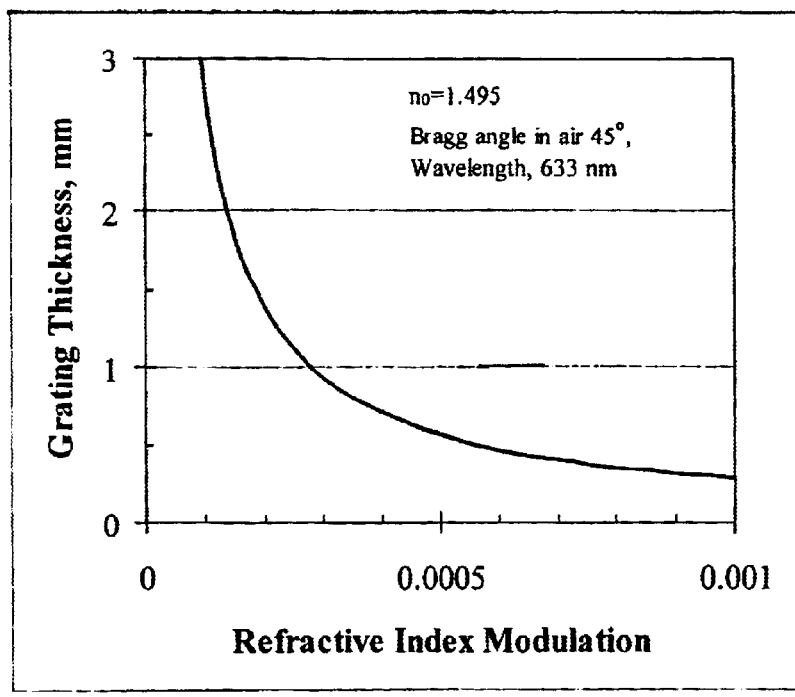
FIG. 4 shows a dependence of thickness PTR Bragg grating of FIG. 2b which provides 100% diffraction efficiency, on refractive index modulation. Bragg angle in air is 45°, wavelength $\lambda = 633$ nm.

Dependence of the grating thickness which provides complete diffraction on refractive index modulation, is presented in FIG. 4. It was shown in said U.S. patent application Ser. No. 09/648,293 that refractive index modulation in PTR glass can be achieved up to 0.001. One can see in FIG. 4 for 633 nm that Bragg gratings in PTR glass with thickness above parts of millimeter can provide complete diffraction of radiation. The same diffraction efficiency can be observed in IR spectral region for PTR gratings of few millimeters thick. Thus formulae (14)–(17) are the basis for calculations of the properties of Bragg gratings in PTR glasses which can be sued for diffractive optical elements designing and fabrication.

Figure 5A:
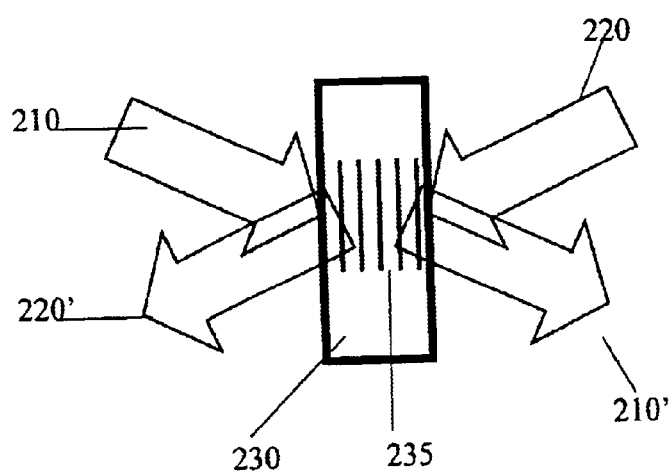
FIG. 5a represents the fabrication of another Bragg grating having beams interacting inside the PTR glass from opposite sides of the PTR glass.

In FIG. 5a, incoming beams 210, 220 are similar to beams 10, 20 described in FIG. 1b, but instead are coming to opposing sides of PTR glass 230 at various incident angles. Interference of incident beams 210, 220 inside glass 230 provide parallel to PTR surface gratings 235 instead of the perpendicular to surface gratings shown in FIG. 1b. Beams 210' and 220' are the attenuated beams after being passed through PTR glass 230.

Figure 5B:
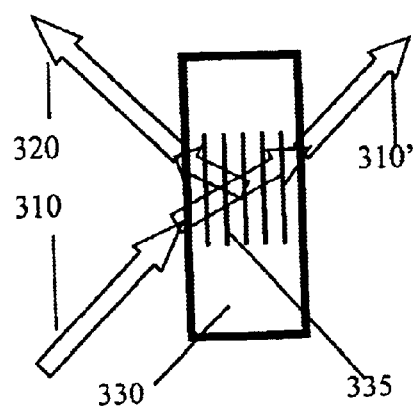

FIG. 5b represents the use of the fabricated Bragg grating of FIG. 5a. Incident beam 310 is identical to beam 110 (described in FIG. 2b). Transmitted beam 310' is similar to beam 110' of FIG. 2b. Diffracted beam 320 reflects to the same side of PTR glass 330 as incident beam 310 and depends on the wavelength and incident angle of beam 310.

$$\Delta \lambda = \frac{\lambda^2}{2nt} \quad (18)$$

Figure 6A:
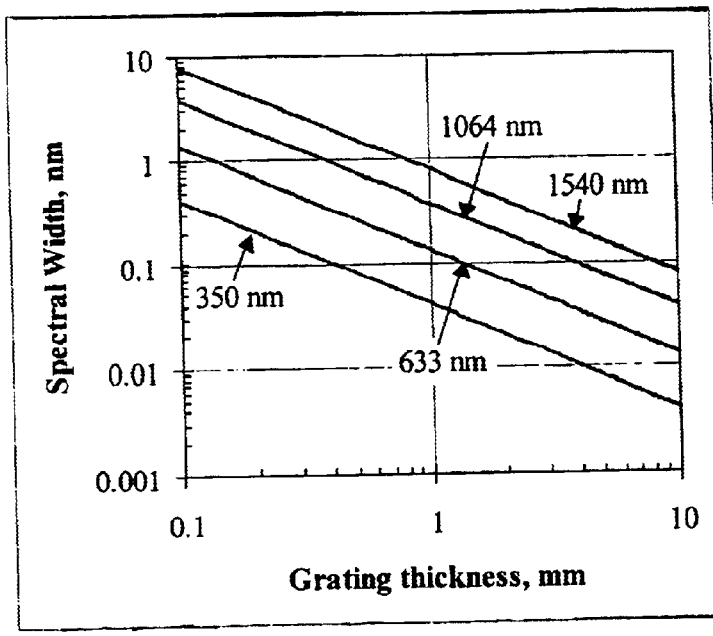
FIG. 6a is the spectral width of Bragg grating (full width at half maximum) versus the thickness of the Bragg grating of FIG. 5b.

Dependence of spectral selectivity of reflective PTR Bragg grating on its thickness is shown in FIG. 6a. One can see that PTR Bragg grating with thickness of 10 mm provides spectral selectivity below 0.1 nm at 1.5 µm, and below 0.01 nm at 350 nm. Thus, spectral selection in PTR Bragg gratings enables operations for optical communications, laser systems, and conventional optics. Reflection coefficient of Bragg mirror as a function of grating thickness is:

$$R = \tanh^2 \frac{\pi n_1 t}{\lambda} \quad (19)$$

Figure 6B:
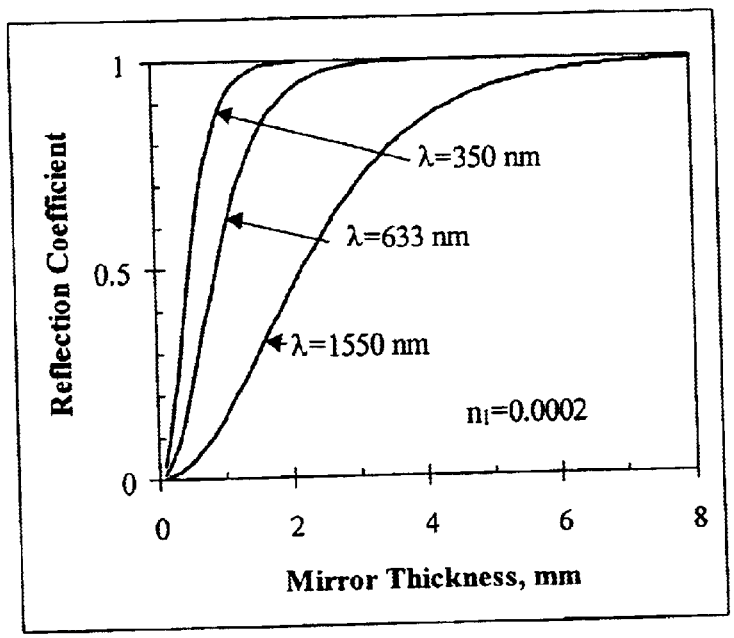
FIG. 6b is a plot of reflection coefficient versus the thickness of Bragg grating of PTR glass.

FIG. 6b shows a dependence of diffraction efficiency of PTR Bragg mirror on grating thickness. One can see that the real parameters of PTR gratings allow recording of 100% mirrors in spectral range from 350 nm to 1550 nm in several millimeters thick PTR glass plate.

Figure 7A:
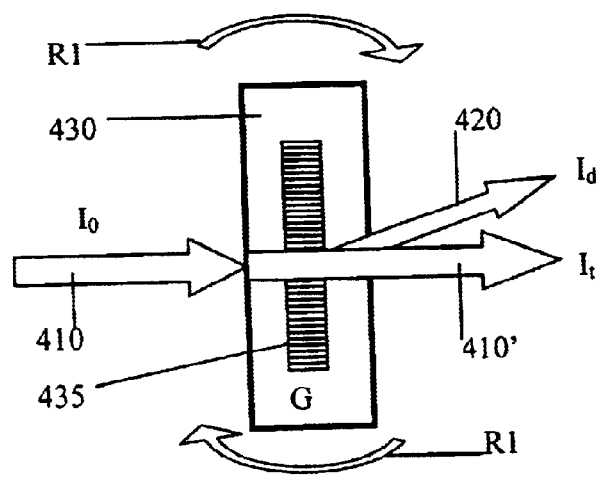
FIG. 7a shows a basic transmitting volume holographic elements in PTR glass for optical beam attenuation, switching, modulation, and splitting.
Figure 7B:
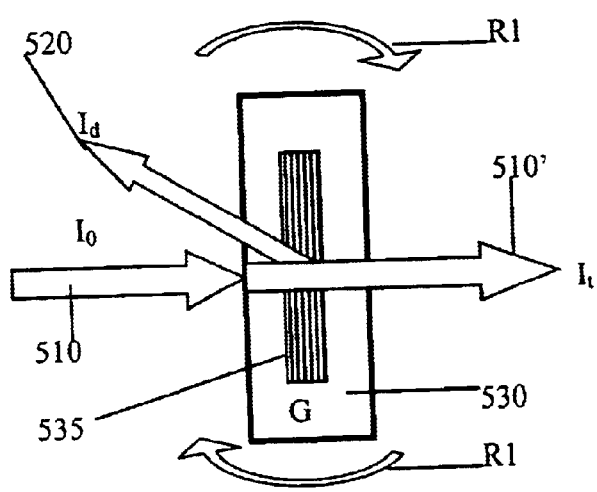
FIG. 7b shows a basic reflecting volume holographic elements in PTR glass for optical beam attenuation, switching, modulation, and splitting.

Thus, we have material (PTR glass) enabling volume hologram recording with unique parameters and mathematical tools for calculations of diffractive optical elements produced in those glasses. Physical characteristics of the 2. Angular Selector FIG. 3a shows angular selectivity of Bragg grating. PTR glass allows creating of the wide variety of angular selectors for different types of optical devices. In dependence on thickness and spatial frequency for both transmitting and reflecting modes, spectral selectivity can be ranged from microradians to tens of milliradians. Typical basic configurations for transmitting and reflecting modes are depicted in FIGS. 7a–7b, respectively. Referring to FIG. 7a, incoming laser beam 410 similar to those previously described passes through Bragg grating 435 in PTR glass 430, the latter of which can pivot in the direction of arrows R1 about axis AX. Bragg gratings 435 are perpendicular to surface of PTR glass 430, so that transmitting beam 410' passes there through, and diffracted beam 420 where intensity of the diffracted beam 420 depends on the incident angle and the wavelength.

Referring to FIG. 7b, incoming laser beam 510 similar to those previously described reflects from Bragg grating 535 in PTR glass 530, the latter of which can pivot in the direction of arrows R1 about axis AX. Bragg gratings 535 are parallel to surface of PTR glass 530, so that transmitting beam 510' passes there through, and diffracted beam 520 reflects back to the same side of PTR glass 530 as incoming beam 510. The intensity of the diffracted beam 520 depends on the incident angle and wavelength.

3. Spatial Filter

The configuration of FIG. 7a can be an element which would be in constant use for designing of optical systems with high quality of beams, which is a spatial filter (also known as a beam cleaner). This element in its conventional embodiment is a couple of confocal lenses with a diaphragm in the focal plan with diameter equal to the first diffractive minimum. This element (spatial filter) provides the selection of lowest propagating mode because angular distribution of radiation is converted to spatial distribution in the focal plane where selecting diaphragm is placed. Strong angular selectivity of thick Bragg gratings in PTR glasses provides an opportunity for angular selectivity without conversion from angular to geometrical space. This is especially important for high-power radiation because of diaphragm destruction by powerful focused beams. Two Bragg gratings with orthogonal directions grating planes can produce two-coordinate selection.

4. Attenuator

Pivoting motion of Bragg grating (as it shown in FIG. 7a and FIG. 7b) results in gradual variation of intensities of diffracted and transmitted beams. This feature can be used for design of optical beam attenuators. Depending on divergency of the beam, transmitting or reflecting mode can be used. Actual losses in PTR gratings do not exceed the value of few percents and side lobes in angular distribution of diffraction efficiency (FIG. 3a) does not exceed 10%. Those numbers allows creation of attenuators with better than tenfold attenuation.

Further creation of PTR glass with lower losses and grating recording with gradual distribution of refractive index modulation will enable higher contrast for single attenuating element. However, design of multistep attenuators provides an opportunity for attenuation for several orders of magnitude. It is important that diameter of diffractive attenuator should not exceed the diameter of the beam. This is great advantage compare to variable attenuators based on neutral glass filters with variable thickness which must have diameter of tens times more that beam diameter. Depending on spatial frequency resulting in variations of Bragg angle, both polarization sensitive and polarization insensitive attenuators can be designed.

5. Switcher/Modulator

A device depicted in FIG. 7a and FIG. 7b (as with all Figures disclosed herein, a common numbering system is used to designate similar beams, gratings and other common components) with two fixed angular positions corresponding maximum and minimum intensities of diffracted or transmitted beams, constitutes an optical switcher. Such a switcher is a very resonant device because of strong angular and spectral selectivity. It is essential that switching for tens of angular degrees can be produced by pivoting motion for several angular minutes in a few millimeters thick PTR grating. For small beam diameters, this diffractive switcher combined with MEMS (micro-electrical-mechanical-system) can provide high rate of transition from one position to another.

In the case of controlled pivoting motion the devices depicted in FIGS. 7a and 7b can serve as modulators. Temporal function of pivoting will be transformed in temporal function of diffracted and transmitted beam intensities in accordance with formula (16). It should be emphasized that incident angles variations for very small values will result in total modulation of the beam.

6. Beam Splitter

Figure 8A:
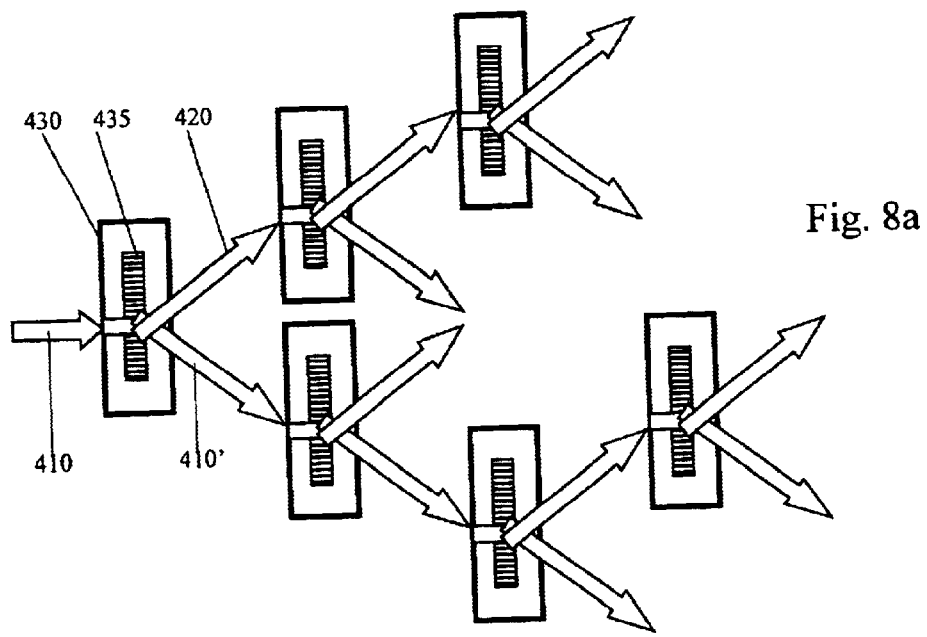
Figure 8B:
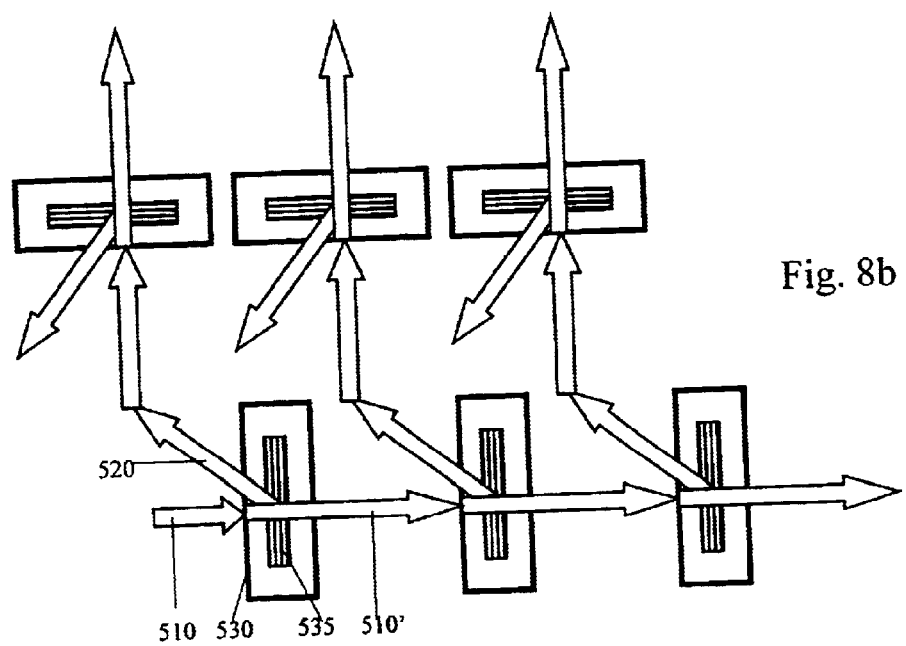
FIG. 8b shows a beam splitting system of plural channels by reflecting through the Bragg gratings of FIG. 7b.

FIGS. 7a and 7b each show a beam splitter for generating two beams. FIGS. 8a and 8b shows the way to design beam splitters with a variable number of beams on the basis of transmitting and reflecting Bragg gratings in PTR glasses of FIGS. 7a and 7b. Pivoting adjustment of each grating allows voluntary variations of splitting coefficients. It is important that size of each element should not be more than the beam diameter. In the case of small Bragg angles, this beam splitter is polarization insensitive. In the case of if the angle of beam propagating in the medium with the grating vector ($\pi/2-\upsilon_m$ in FIG. 2a) is close to 45°, beam splitting becomes a polarization sensitive one. Low losses in PTR gratings allow creation of a beam splitter with an arbitrary number of channels and arbitrary splitting ratios at each point.

7. Beam Sampler

It is important problem for lasers, especially for high-power lasers, to conduct adequate measurements of laser parameters (wavelength, energy, angular divergency, etc.) because a great number of beam splitters (such as those in FIGS. 7a and 7b) consume significant part of laser energy and can distort laser beam including scattering from the multiple surface. Low losses in PTR Bragg gratings allow recording of a desirable number of gratings with very low diffraction efficiency (down to $10^{-4}$) in the single glass plate. All diffracted beams conserve features of laser beam and can be used for independent measurements of different parameters. High threshold of laser damage enables the use of such elements in all types of laser systems working in visible and near IR spectral regions.

8. Beam Deflector Controlled by Positioning of Grating Matrix

Figure 9A:
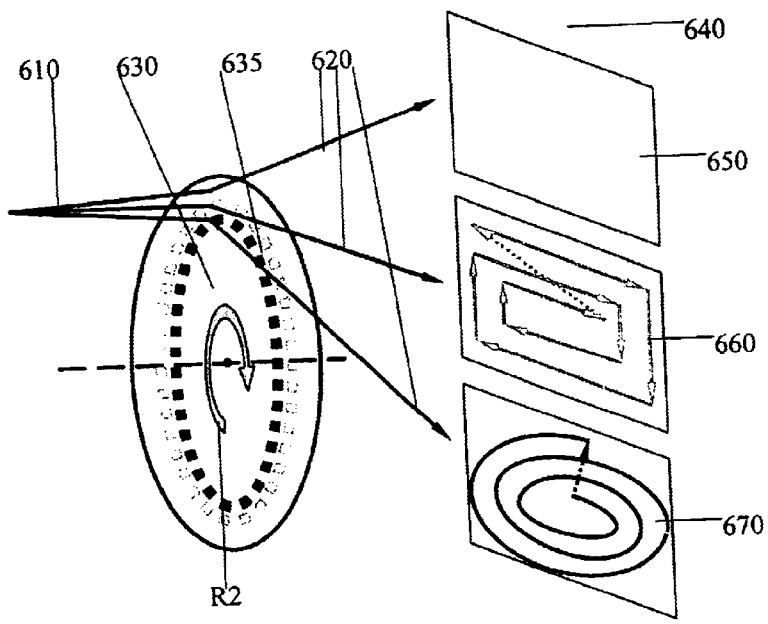
FIG. 9a shows the laser beam deflector addressed by mechanical positioning of the matrix of gratings.

FIG. 9a shows beam steering by utilizing the matrix of Bragg gratings 635 recorded in PTR glass flat disc ring 630. All grating 635 should be recorded in such way to have the same Bragg angle for incident beam and various exit angles to provide selectable scanning of the space 640 with trajectories 650, 660, 670. It can be done in configuration of compact disk 630 as it is shown in FIG. 9a, or in any other configuration, e.g. orthogonal matrix. A simple estimation of capacity of such system can be done. For the laser beam 610 of 1 mm diameter, 100 gratings/cm² can be recorded in glass plate 630. Compact disk 630 has surface of about 100 cm². Consequently, $10^4$ gratings 635 can be recorded in one disk 630 of about 120 mm diameter and therefore $10^4$ positions in the space can be pointed. It is important that two-step process of hologram recording in PTR glass (exposure and development) allows writing of several elements in the same volume of glass with no interaction between different holograms. This means that angular scanning of matrix can result in dramatic capacity increase.

9. Beam Deflector Controlled by Small-angle Master Deflector

Figure 9B:
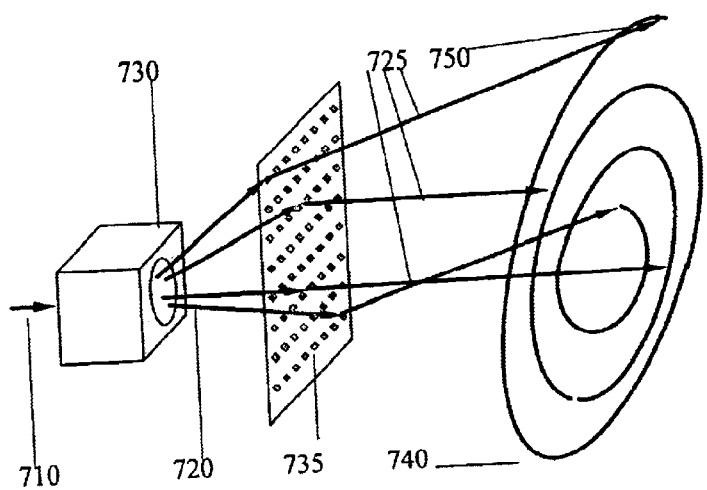
FIG. 9b shows the laser beam deflector by angular addressing of laser beam by a small-angle master deflector.

Referring to FIG. 9b, beam steering at small angles (below 5°) as shown by beams 720 is produced by conventional electro-optical 730, acousto-optical or liquid crystal devices. However, laser beam 720 deflection to larger angles faces a lot of problems. One of the most promising solutions can be the use of conventional methods not for free space scanning but for angular addressing of matrix of volume gratings 735 in PTR glasses. In the last case, small angles 720 available with conventional methods can be transformed into voluntary angles 725 covering the whole sphere in the free space 740 to provide trajectory 750 in said free space 740. There is an additional advantage of such approach because this scanner has no moving parts and therefore should be very reliable in severe conditions of exploitation (vibrations, etc.). It is important that different holograms can overlap in the glass plate but can be read separately because of high angular sensitivity of thick Bragg grating. Moreover, it is important that matrix of holograms is just transparent glass blank and a number of matrices can be placed consequently.

10. Beam Deflector Controlled by Spectral Scanning

Figure 10A:
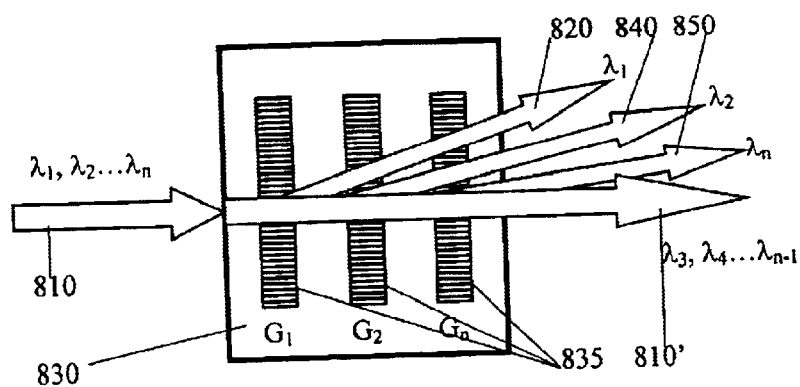
FIG. 10a shows the spectrally addressed laser beam deflector in transmitting Bragg gratings (G1, G2, G3) of different resonant wavelengths.

One more solution of the beam steering system with no moving parts is based on high spectral selectivity of Bragg gratings with thickness up to several millimeters that can be achieved in PTR glasses. One can see in FIG. 3b and FIG. 6a that spectral scanning even for parts of nanometer changes significantly diffraction efficiency of such Bragg gratings. Referring to FIG. 10a, this means that wavelength variations in the laser beam 810 propagating through a number of Bragg gratings 835 adjusted for different wavelengths, would cause excitation of different gratings 835 and, consequently, diffraction of radiation at different angles. General examples of such devices working both in transmitting and reflecting modes are shown in FIG. 10a. It is clear that gratings 835 can overlap in the same glass volume 830, or be separated, or be recorded in different glass plates 830 placed consequently. It is clear that spectral scanning 810', 820, 840, 850 can be combined with angular scanning which is shown in FIG. 9a and FIG. 9b.

Figure 10B:
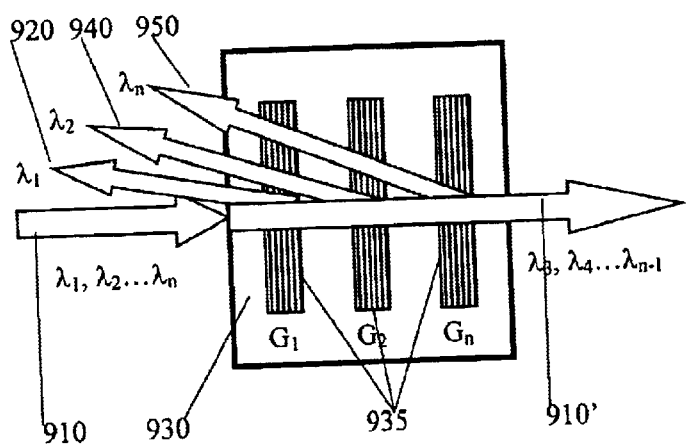
FIG. 10b shows the spectrally addressed laser beam deflector in reflecting Bragg gratings (G1, G2, G3) of different resonant wavelengths.

Referring to FIG. 10b, this means that wavelength variations in the laser beam 910 reflecting through a number of Bragg gratings 935 adjusted for different wavelengths, would cause excitation of different gratings 935 and, consequently, diffraction of radiation at different angles. It is clear that gratings 935 can overlap in the same glass volume 930, or be separated, or be recorded in different glass plates 930 placed consequently. It is clear that spectral scanning 910', 920, 940, 950 can be combined with angular scanning which is shown in FIG. 9a and FIG. 9b.

11. Selector of Particular Wavelengths (Also Known as Notch Filter, Add/Drop Element)

Figure 11A:
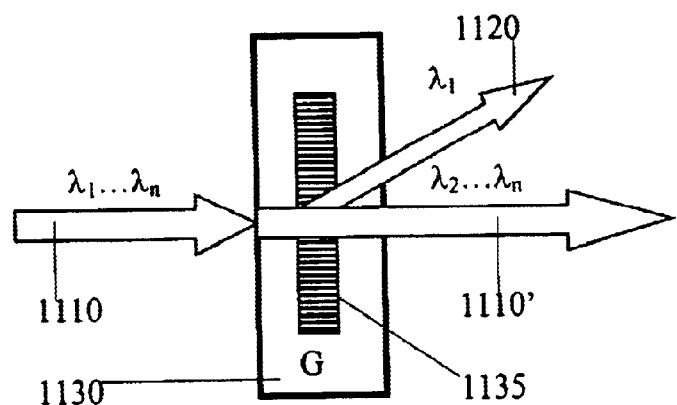
FIG. 11a shows diffractive add/drop spectral filter in transmitting Bragg gratings for multichannel optical communication.
Figure 11B:
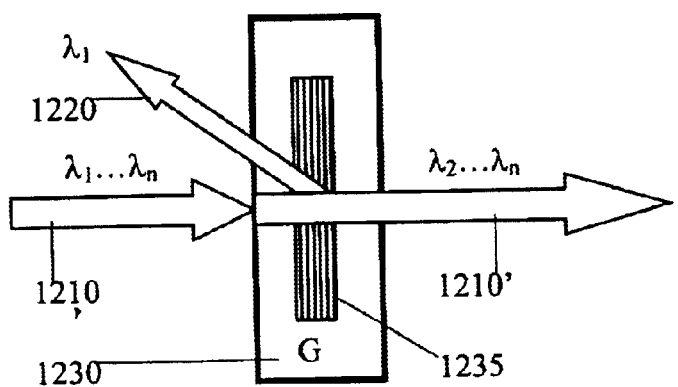
FIG. 11b shows diffractive add/drop spectral filter in reflecting Bragg gratings for multichannel optical communication.

Spectral selectivity and low losses in PTR volume gratings enable precise spectral selection at designated wavelengths (FIGS. 11a and 11b). Labels 1110, 1110', 1120, 1130, 1135, 1210, 1210', 1220, 1230, 1235 read on and function similar to like label numbers in FIGS. 7a and 7b. In this device, one particular wavelength is removed from the beam consisting from several wavelengths. Spectral width of cut off radiation can vary in dependence on wavelength, spatial frequency and thickness of grating. One can see in FIG. 6a that spectral width of several millimeters thick Bragg gratings in PTR glass can achieve 0.1 nm in near IR region and 0.01 nm in near UV region. This feature enables application of such devices in WDM optical communications for channel separation (both multiplexing and demultiplexing shown in FIG. 12a and FIG. 12b) and add/drop operations (current channel separation is 0.8 nm, projected value for ultra-dense systems is 0.2 nm). Notch filters for spectral surveillance receivers in visible and UV regions with spectral selectivity below 0.1 nm, high efficiency and low losses can be fabricated in PTR glasses.

Figure 12A:
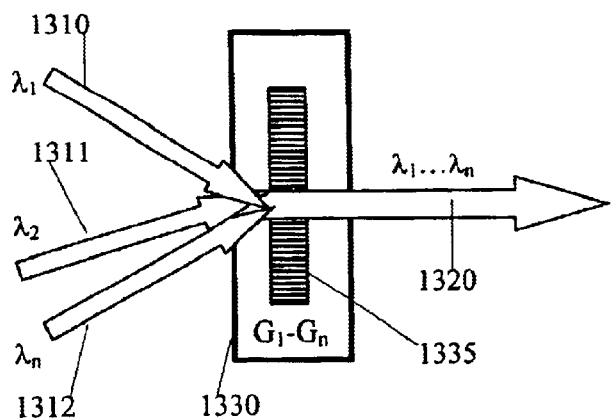
FIG. 12a illustrates a multiplexer produced by multiple gratings recording in the same volume PTR glass.

Referring to FIG. 12a, three incoming incident laser beams 1310, 1311, 1312 are diffracted in the same direction 1320 after passing through Bragg gratings 1335 in PTR glass 1330.

Figure 12B:
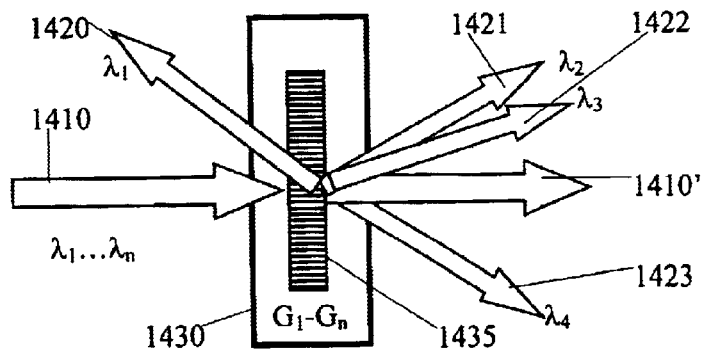
FIG. 12b illustrates a demultiplexer produced by multiple gratings recording in the same volume PTR glass.

Referring to FIG. 12b, for the demultiplexing example, the incident beam 1410 containing several wavelengths passes through Bragg gratings 1435 in PTR glass 1430 is diffracted to different angles for each wavelength 1420, 1421, 1422, and 1423.

12. Spectral Shape Former (Also Known as Gain Equalizer)

Figure 13A:
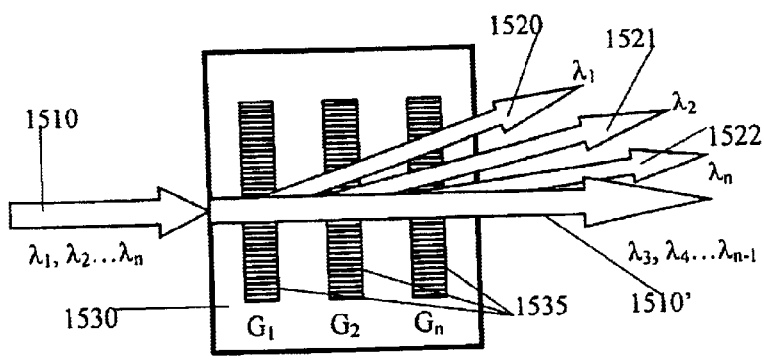
FIG. 13a shows a spectral corrector for lasers and amplifiers.

In contrary to the previous problem of narrow spectral lines selection, there is a problem of spectral shape forming for different types of optical systems. As an example, one can consider the problem of equalizing of spectral dependence of gain in Er-doped amplifiers, which is necessary for extending of spectral width of amplification. The whole amplification area of Er-doped glass consists of several overlapped bands with spectral width ranged from 5 to 20 nm. Such spectral selection is achieved in transmitting Bragg gratings in PTR glasses with following parameters. Thickness ranged from 0.5 to 3 mm, refractive index modulation ranged from 0.0002 to 0.001, spatial frequency ranged from 200 to 600 mm$^{-1}$. An illustration of such device working principles is shown in FIG. 13a. The incident beam 1510 interacts with Bragg gratings 1535 in PTR glass 1530 and produces diffracted beams 1522, 1521, and 1520. Transmitting beam 1510' has spectral shape in according with overlapping of spectral shapes of all Bragg gratings 1535.

Figure 13B:
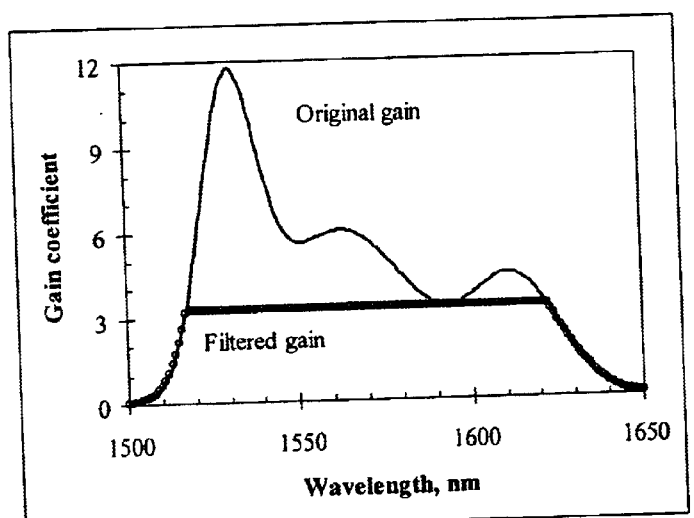
Figure 13C:
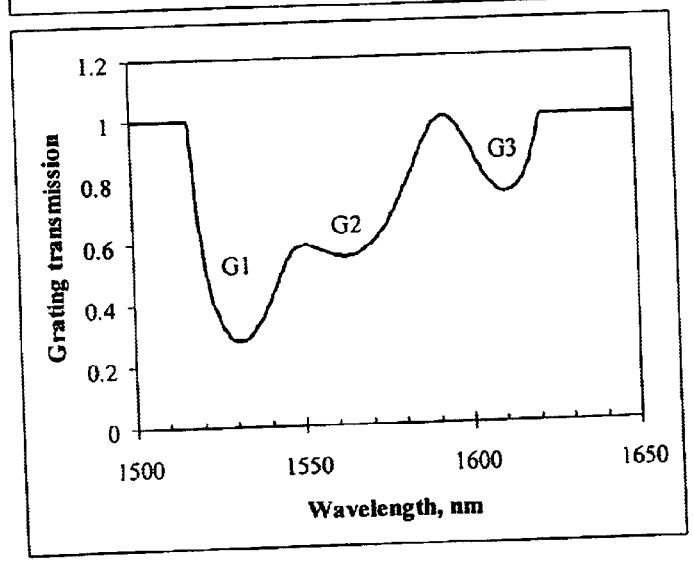
FIG. 13c shows transmission dependence of corrector of FIG. 13a on wavelength.

Let us assume that the original gain spectrum consists of three bands as is shown in FIG. 13b. This radiation is filtered by the device shown in FIG. 13a consisting of three Bragg gratings ($G_1$, $G_2$, and $G_3$) with summarized spectral selectivity shown in FIG. 13c. The result of such filtering is shown in FIG. 13b. One can see that resulting spectral shape of emitted radiation is flat in a wide spectral region. This approach can be applied for designing of different spectral formers in dependence of required spectral shapes. The same element in reflecting Bragg grating placed in laser resonator can form specific emission spectrum of master oscillator. The area of application can be very wide because of wide variations of parameters of Bragg gratings in PTR glasses (spectral width ranged approximately from 0.01 to 100 nm).

13. Spectral Sensor (Also Known as Wavelength Meter/wavelocker)

Figure 14A:
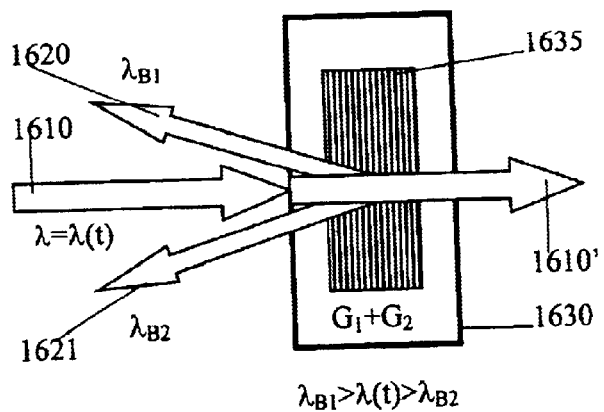
FIG. 14a shows a spectral sensor for laser spectrum stabilization also known as wavemeter or wavelocker.
Figure 14B:
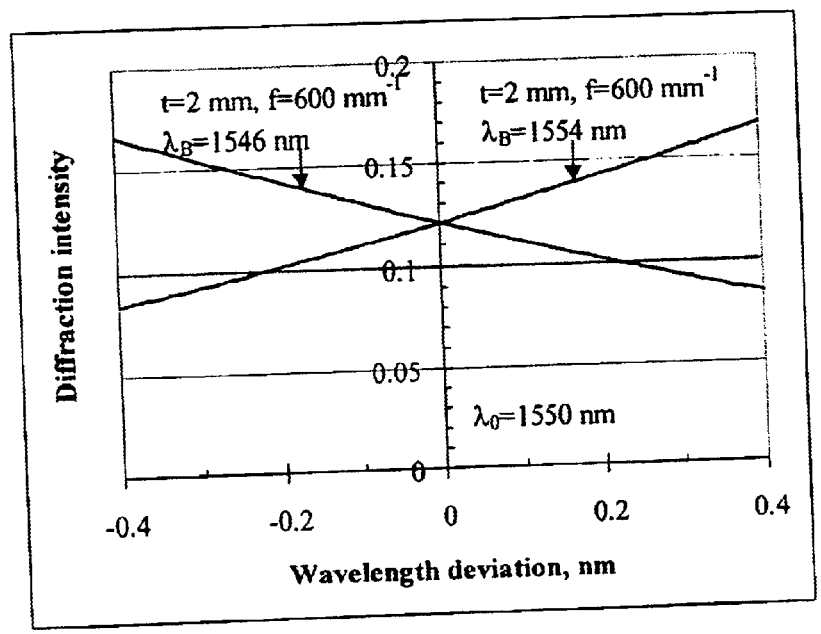
FIG. 14b illustrates dependence of Bragg gratings' diffraction efficiency of FIG. 14a on wavelength deviation from the mean frequency.

Controllable spectral selectivity and stability of Bragg gratings in PTR glasses enable their use as spectral sensors to control wavelength of radiation. Several designs can be proposed to detect a wavelength of radiation. One possible example is shown in FIG. 14a. Incident radiation 1610 with variable wavelength $\lambda=\lambda(t)$ where t is time, is launched to PTR plate 1630 (or plates) with two Bragg gratings 1635 $G_1$ and $G_2$. Those Bragg gratings 1635 have resonant wavelengths placed on the both sides from the wavelength to be controlled $\lambda_{B1}>\lambda(t)>\lambda_{B2}$. Beams 1620, 1621 are diffracted back by parallel diffraction gratings 1635, and the transmitting beam 1610' passes through the other side of PTR glass 1630. The distance between Bragg wavelength and controllable one $[\lambda_{B1}-\lambda(t)]$ and spectral width of each Bragg grating should be selected to cover the possible region of wavelength variations and provide reasonable diffraction efficiency. In this case, spectral shift of controlled wavelength would cause increasing of diffraction efficiency for one grating and decreasing of diffraction efficiency for the other one. The ratio of signals detected from gratings gives position of controlled wavelength. This signal can be used both for measurement and automatic control and stabilization. As an example, relative intensities of radiation diffracted by two Bragg gratings recorded in PTR glass are shown in dependence on wavelength mistuning (FIG. 14b). One can see that for spectral region of optical communication a wavelength control with accuracy in the range of tenths of nanometer and even below 0.1 nm can be achieved for reasonable parameters of Bragg gratings in PTR glass. Transmitting gratings can be used if less spectral sensitivity is necessary.

14. Angular Sensor (Also Known as Pointing Locker)

Figure 15A:
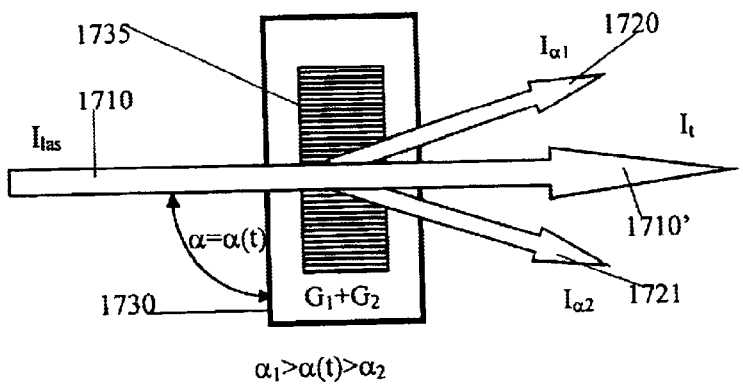
FIG. 15a shows an angular sensor for laser beam pointing stabilization, also known as pointing locker.
Figure 15B:
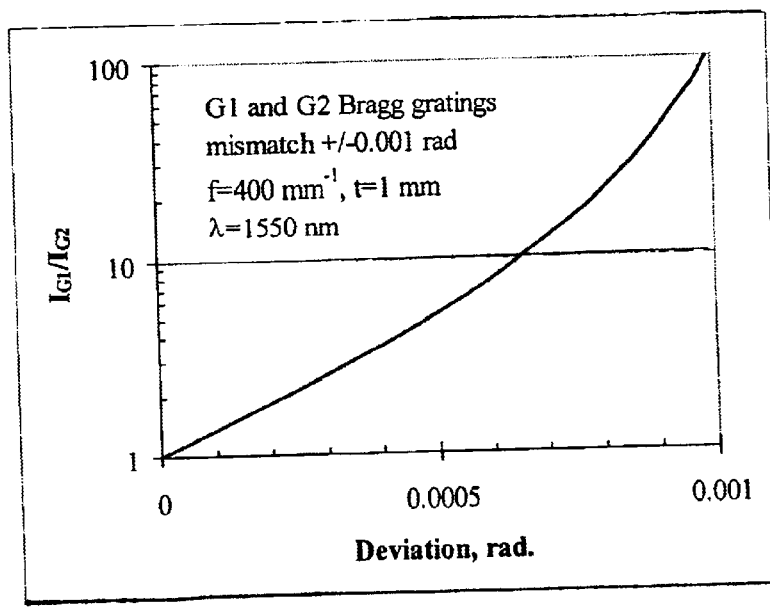

High angular selectivity and stability of Bragg gratings 1735 in PTR glasses 1730 enable their use as angular sensors for pointing stabilization of laser radiation. One of the possible designs is shown in FIG. 15a. Incident beam 1710 with variable direction of propagation $\alpha=\alpha(t)$ in the plane of the FIG. 15a is launched to PTR plate 1730 (or plates) with two Bragg gratings 1735 $G_1$ and $G_2$. Those gratings 1735 have Bragg angles placed on the both sides from the desirable angle $\alpha_{B1}>\alpha(t)>\alpha_{B2}$. The angle between Bragg direction and controlled radiation propagation $[\alpha_{B1}-\alpha(t)]$ and angular width of each Bragg grating should be selected to cover the possible region of angular variations and provide reasonable diffraction efficiency. In this case, angular variations of controlled beam would cause increasing of diffraction efficiency for one grating and decreasing of diffraction efficiency for the other one. Beams 1720, 1721 are diffracted by parallel Bragg gratings 1735 on opposite side of PTR glass 1730, with transmitted beam 1710'. The ratio of signals detected from gratings 1735 gives actual direction of controlled beam 1710. This signal can be used both for measurement and automatic control and stabilization. As an example, this ratio is shown in dependence on angular mismatching in FIG. 15b. One can see that angular fluctuations comparable with diffraction limited divergency of laser radiation in near IR region can be detected by Bragg grating in PTR glass with achievable parameters.

15. Bragg Spectrometer (Also Known as Spectral Analyzer)

Figure 16A:
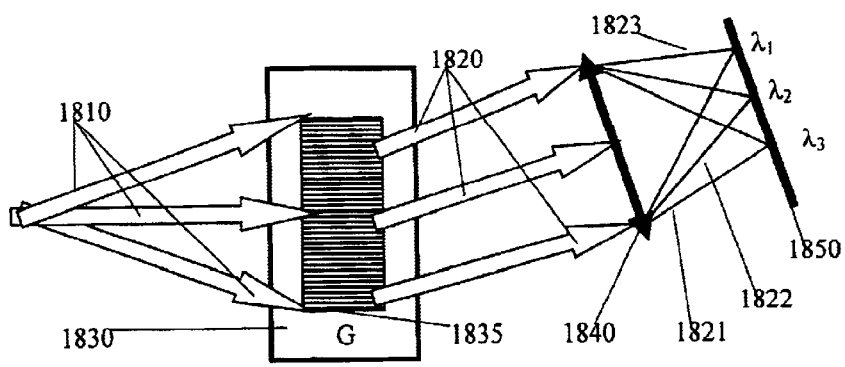
FIG. 16a shows spectral analyzer, also known as spectrometer in transmitting Bragg grating.
Figure 16B:
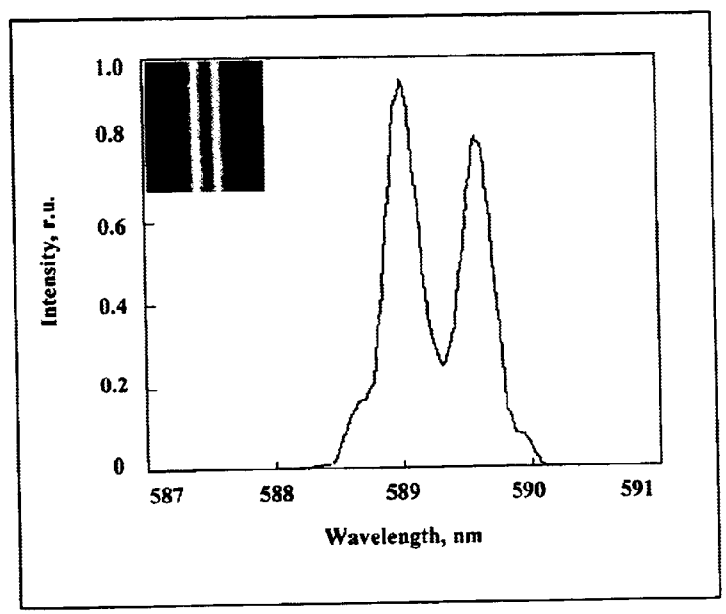
FIG. 16b illustrates a photo and emission spectrum of sodium doublet with spectral separation of 0.6 nm.

Combination of high spectral and angular selectivity of thick Bragg gratings achievable in PTR glasses, enable creation of a spectrometer with no slit and no entrance condenser. Let us consider a beam 1810 with arbitrary angular and spectral distribution of radiation (FIG. 16a). Thick Bragg grating 1835 selects only one wavelength from each angle of incidence and transforms it to diffracted monochromatic beam pointed in some particular direction. This means that all spectral components mixed at all angles in an incident beam will be separated by angles in diffracted beam. Incoming beam 1810 passes through perpendicular Bragg gratings 1835 in PTR glass 1830 forming diffracted beam 1820 which is focussed through lens 1840 forming spectrum of wavelengths 1821, 1822, and 1823 in focal plane 1850. An opportunity to make several centimeters thick Bragg gratings with spatial frequencies up to several thousands per millimeter in PTR glass allows spectral analysis of lines separated for parts of nanometer only with no slit and collimating of the beam (FIG. 16b). One can see in this figure that two spectral lines of yellow sodium doublet (0.6 nm separation) are resolved by PTR grating with spatial frequency of 2500 mm$^{-1}$. It is clear that such spectrometer cannot replace conventional spectrometers with wavelength scanning in wide spectral region, however, portable Bragg spectrometers with high resolution with no movable parts

17 look very promising for a number of applications. The Bragg spectrometer can also be built with parallel Bragg gratings as previously described.

16. Mode Selectors in Laser Resonator

Figure 17A:
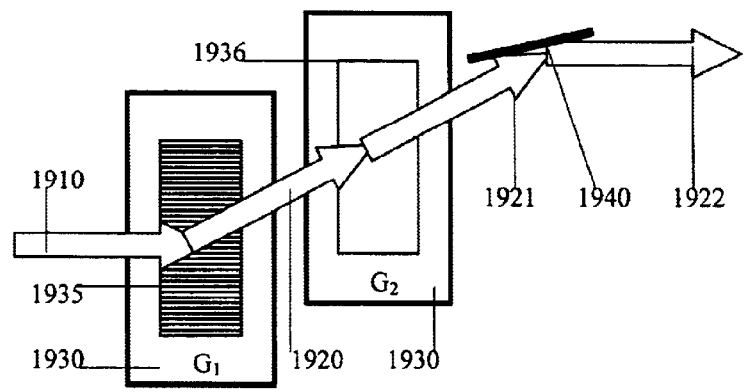
FIG. 17a shows transmitting angular and spectral selector in a laser resonator with Bragg gratings.
Figure 17B:
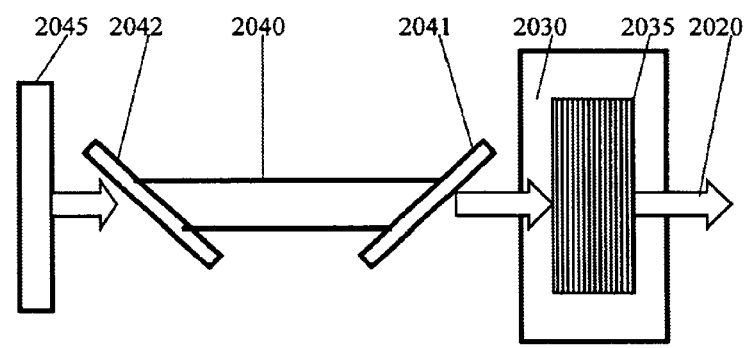
FIG. 17b shows a reflecting spectral selector in a laser resonator.
Figure 17C:
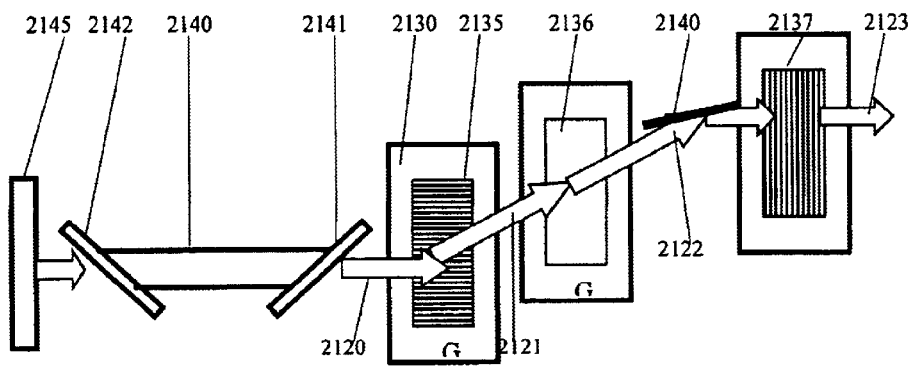
FIG. 17c shows a combination of transmitting and reflecting angular and spectral selectors.

High spectral and angular selectivity combined with high diffraction efficiency of Bragg gratings in PTR glasses enable creating of mode selectors in laser resonator (FIGS. 17a, 17b, and 17c). FIG. 17a shows the use of transmitting gratings 1935 placed in laser resonator as transversal mode selectors. A conventional method of transversal mode selection is based on difference in radial distributions for modes with different numbers and traditional embodiment is a diaphragm of proper diameter placed in a laser resonator. However, this method results in significant increasing of resonator length. The use of Bragg gratings 1935 with high angular selectivity allows a decrease in a resonator length for the same resonator diameter. A couple of gratings 1935 shown in FIG. 17a serve for selection of transversal modes with orthogonal orientation. It is clear that those gratings 1935 produce additional spectral selection too. Referring to FIG. 17a, incoming beam 1910 passes through perpendicular Bragg grating 1935 to form diffracted beam 1920 which passes through Bragg grating 1936 turned about vertical axis for 90° forming beam 1921 diffracted in the plane perpendicular to the plane of drawing and is reflected by mirror 1940 to provide 1922 in the same direction as beam 1210.

However, spectral selection is significantly higher in reflecting gratings compare to transmitting ones. This is why the use of Bragg mirrors as output couplers (FIG. 17b) looks very promising for selection of longitudinal modes. This type of selectors can be used as a sole element for resonators with relatively high distance between longitudinal modes or in combination with high-resolution devices (e.g. Fabri-Perot resonator). Referring to FIG. 17b, laser radiation produced by active lasing element 2040 (e.g. YAG:Nd or He—Ne) having windows 2041, 2042 within a laser cavity formed by mirrors 2045 and output coupler 2035 which can be the novel Bragg grating 2035 in PTR glass 2030, forming laser output beam 2020 having a selected frequency or frequencies.

A combination of transmitting and reflecting Bragg gratings in the same resonator allows selecting of both transversal and longitudinal modes (FIG. 17c). Referring to FIG. 17c, laser radiation produced by active lasing element 2140 (such as a yttrium aluminum garnet doped with neodymium) having windows 2141, 2142 within a laser cavity formed by mirror 2145 and transmitting perpendicular Bragg grating 2135 forming laser output beam 2121 passing to second Bragg grating 2136 to form second diffracted beam 2122 which passes to reflecting parallel Bragg grating 2137 having final transmitted beam 2123.

The optical components such as the beam splitter, the spatial filter, the attenuator, as previously discussed can be used in optical systems such as but not limited to telescopes, photo-cameras, laser range finders, laser receivers, optical communications, laser resonators, satellite surveillance systems, military and commercial applications.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A volume holographic optical element comprising:

photo-thermal-refractive(PTR) glass having an absolute diffraction efficiency of greater than at least 96%, and having low losses depending on grating orientations in the PTR glass, wherein the PTR glass is useful as a volume holographic optical element.

2. The volume holographic optical element of claim 1 of photo-thermal refractive (PTR) glass with the low losses below approximately 5% working in transmitting mode depending on grating orientation in the PTR glass.

3. The volume holographic optical element of claim 2 as a beam splitter.

4. The volume holographic optical element of claim 2 as a spectral shape former.

5. The volume holographic optical element of claim 1 of photo-thermal refractive (PTR) glass with the low losses below approximately 5% working in reflecting mode depending on grating orientation in the PTR glass.

6. The volume holographic optical element of claim 5 as a beam sampler.

7. The volume holographic optical element of claim 1 as an angular selector.

8. The volume holographic optical element of claim 1 as a spatial filter.

9. The volume holographic optical element of claim 1 as an attenuator.

10. The volume holographic optical element of claim 1 as a switcher.

11. The volume holographic optical element of claim 1 as a modulator.

12. The volume holographic optical element of claim 1 as a beam deflector controlled by positioning of grating matrix.

13. The volume holographic optical element of claim 1 as a beam deflector controlled by a small-angle master deflector.

14. The volume holographic optical element of claim 1 as a beam deflector controlled by spectral scanning.

15. The volume holographic optical element of claim 1 as a selector of particular wavelengths.

16. The volume holographic optical element of claim 1 as a spectral sensor.

17. The volume holographic optical element of claim 1 as an angular sensor.

18. The volume holographic optical element of claim 1 as a Bragg spectrometer.

19. The volume holographic optical element of claim 18, wherein the Bragg spectrometer includes: gratings having spacing between each layers in the gratings of approximately 0.5 microns.

20. An optical element comprising:

photo-thermal-refractive(PTR) glass having an absolute diffraction efficiency of greater than at least 96%; and means for using the PTR glass as a volume holographic optical element.

21. The optical element of claim 20, wherein the PTR glass includes:

losses below approximately 5% working in a transmitting mode depending on grating orientation in the PTR glass.

22. The optical element of claim 20, wherein the PTR glass includes:

losses below approximately 5% working in reflecting mode depending on grating orientation in the PTR glass.

23. A photo-thermal-refractive(PTR) glass, comprising:

a transparency between approximately 300 nm and approximately 4000 nm;

induced losses below approximately 0.1 cm$^{-1}$;

photosensitivity between approximately 280 nm to approximately 370 nm;

exposure dozes between approximately 50 mJ/cm$^2$ to approximately 5000 mJ/cm$^2$;

refractive index variations up to approximately 10$^{-3}$;

spatial frequencies up to approximately 10000 mm$^{-1}$; and an absolute diffraction efficiency of greater than at least 96%.

24. The photo-thermal-refractive(PTR) glass of claim 23, wherein the induced losses include:

induced losses in visible region of less than approximately 0.1 cm$^{-1}$.

25. The photo-thermal-refractive(PTR) glass of claim 23, wherein the induced losses include:

induced losses in infrared region(IR) of less than approximately 0.01 cm$^{-1}$.

* * * * *